United States Patent
Kaku

(10) Patent No.: US 11,376,667 B2
(45) Date of Patent: Jul. 5, 2022

(54) MACHINING TOOL AND WORKPIECE MEASUREMENT METHOD

(71) Applicant: STAR MICRONICS CO., LTD., Shizuoka (JP)

(72) Inventor: Norio Kaku, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 0 days.

(21) Appl. No.: 16/887,355

(22) PCT Filed: Dec. 21, 2018

(86) PCT No.: PCT/JP2018/047192
§ 371 (c)(1),
(2) Date: Sep. 2, 2020

(87) PCT Pub. No.: WO2019/146335
PCT Pub. Date: Aug. 1, 2019

(65) Prior Publication Data
US 2021/0237163 A1  Aug. 5, 2021

(30) Foreign Application Priority Data
Jan. 25, 2018  (JP) .............................. JP2018-010943

(51) Int. Cl.
*B23B 25/06* (2006.01)
*B23B 13/12* (2006.01)
*B23Q 17/20* (2006.01)

(52) U.S. Cl.
CPC ............ *B23B 25/06* (2013.01); *B23B 13/125* (2013.01); *B23Q 17/20* (2013.01)

(58) Field of Classification Search
CPC .............. B23B 25/06; B23B 2260/128; B23B 2270/48; B23Q 17/20; B23Q 17/2452; B23Q 17/2471; B23Q 2217/003
See application file for complete search history.

(56) References Cited

U.S. PATENT DOCUMENTS
2009/0133239 A1  5/2009 Tanaka
2011/0033254 A1  2/2011 Abrams
(Continued)

FOREIGN PATENT DOCUMENTS
CN  106736862  5/2017
JP  61131854 A * 6/1986  ............ B23Q 17/20
(Continued)

OTHER PUBLICATIONS

English translation of JP 2002-052445 (Year: 2002).*
(Continued)

*Primary Examiner* — Alan Snyder
(74) *Attorney, Agent, or Firm* — Lex IP Meister, PLLC

(57) ABSTRACT

A machine tool improving measurement accuracy of a machined workpiece diameter. A machine tool comprises a displacement sensor mounted on at least one of a guide bush and a spindle supporting unit. The machine tool further comprises a calculating unit which calculates a diameter of the machined workpiece based on a measurement value of the machined workpiece by the displacement sensor. The spindle is movable back and forth in an axial direction. The spindle is retracted after machining to bring a machined portion of the workpiece to a predetermined measurement position in the axial direction to allow the displacement sensor to measure the machined portion.

13 Claims, 7 Drawing Sheets

(56) References Cited

U.S. PATENT DOCUMENTS

2014/0130571 A1    5/2014  Mai et al.
2017/0001258 A1    1/2017  Hildebrand et al.

FOREIGN PATENT DOCUMENTS

| | | |
|---|---|---|
| JP | S61-125705 | 6/1986 |
| JP | S62-130156 | 6/1987 |
| JP | H05131301 | 5/1993 |
| JP | H07-3902 | 1/1995 |
| JP | 2002-052445 | 2/2002 |
| JP | 2003-136368 | 5/2003 |
| JP | 2004-090170 | 3/2004 |
| JP | 3901290 | 4/2007 |
| JP | 2011-093068 | 5/2011 |
| JP | 4865490 | 2/2012 |
| KR | 2009-0053689 | 5/2009 |
| TW | 200702101 | 1/2007 |
| TW | 201725087 | 7/2017 |

OTHER PUBLICATIONS

TIPO, Office Action of Application No. 107136729, dated Dec. 27, 2021.
KIPO, Office Action of KR 10-2020-7017176 dated Jun. 30, 2021.
EPO, Search Report of EP 18902814.5 dated Jul. 23, 2021.
JPO, Notice of Allowance of JP 2018-010943 dated Mar. 25, 2022.

* cited by examiner

MACHINING TOOL AND WORKPIECE MEASUREMENT METHOD

CROSS-REFERENCE TO RELATED APPLICATION

The present application claims priority of PCT Application No. PCT/JP2018/047192 filed on Dec. 21, 2018, which claims priority of Japanese Patent Application No. 2018-010943 filed on Jan. 25, 2018. The contents of this application are incorporated herein by reference in their entirety.

BACKGROUND

(a) Field

The present invention relates to a machine tool and a workpiece measurement method.

(b) Description of the Related Art

A workpiece measurement method is well known in a field of a machine tool. In Japanese Unexamined Patent Application Publication No. S62-130156, a measuring instrument provided with a touch sensor is attached to a surface of a turret tool post to detect the diameter of a workpiece. In Japanese Examined Patent Application Publication No. 4865490, a workpiece diameter measuring apparatus provided with a laser measuring instrument is mounted on a bed where a headstock, tool post, opposite spindle, and turret tool post are all mounted. In Japanese Examined Patent Application Publication No. 3901290, a measuring instrument for the diameter of a workpiece is provided with a pair of claws to hold an object to detect the dimensions of the held portions of the object.

SUMMARY

In Patent Documents 1 and 2, the measuring instrument is distant from the object (the workpiece). Positional relationship between the instrument and the workpiece is not stable due to thermal displacement occurring in the instrument, the workpiece, and a plurality of structures (such as a tool post, a bed, and a headstock) existing on the path connecting the instrument and the workpiece. It is likely that a measurement error in diameter of the workpiece occurs. In Patent Document 3, cutting chips are possibly caught in the claws in an environment of a lathe where cutting chips are heavily produced. It is difficult to measure the workpiece diameter with accuracy.

The purpose of the invention is to provide a machine tool and a workpiece measurement method capable of measuring the diameter of the workpiece with accuracy.

A machine tool of the invention comprises a displacement sensor mounted on at least one of a guide bush and a spindle supporting unit. The guide bush supports a workpiece on a front side of a spindle holding the workpiece. The machine tool further comprises a calculating unit which calculates a diameter of the machined workpiece based on a measurement value of the machined workpiece by the displacement sensor. Accordingly, the displacement sensor is mounted on at least one of the guide bush for the workpiece and the supporting unit for the spindle. The displacement sensor is at a short distance from the workpiece and they are in almost the same environment. Accordingly, a measurement result (calculation result) of the workpiece diameter is available with little error.

The spindle is movable back and forth in an axial direction. The spindle is retracted after machining to bring a machined portion of the workpiece to a predetermined measurement position in the axial direction to allow the displacement sensor to measure the machined portion. Accordingly, the machined portion of the workpiece can be exactly measured by the displacement sensor.

The guide bush comprises a cylindrical non-rotatable section and a rotatable section rotatable in synchronization with the spindle. The rotatable section is inside the non-rotatable section so as to support the workpiece. The rotatable section has a through-hole to expose part of the workpiece. The displacement sensor mounted on the non-rotatable section measures the workpiece through the through-hole of the rotatable section. Accordingly, the displacement sensor mounted on the non-rotatable section of the guide bush can measure the workpiece through the through-hole provided in the rotatable section.

The spindle supporting unit is provided with the guide bush in a detachable manner. The displacement sensor mounted on the spindle supporting unit measures the workpiece held by the spindle in a state that the guide bush is detached from the supporting unit. Accordingly, the displacement sensor mounted on the spindle supporting unit can measure the workpiece held by the spindle supported by the supporting unit.

The machine tool of the invention is further provided with a temperature sensor which measures a temperature around a position where the displacement sensor is mounted. The calculating unit corrects the measurement value of the workpiece by the displacement sensor according to a measurement value by the temperature sensor and then calculates the diameter of the workpiece based on the corrected measurement value. Accordingly, the calculating unit can calculate the diameter of the machined workpiece with higher accuracy by correcting the temperature-variable measurement value by the displacement sensor according to the measurement value by the temperature sensor.

The inventive concept can be realized in any manner but the apparatus. For example, the invention includes a workpiece measurement method comprising measuring a machined workpiece by a displacement sensor mounted on at least one of a guide bush for the workpiece and a supporting unit for the spindle and calculating a diameter of the machined workpiece based on a measurement value of the machined workpiece by the displacement sensor. The invention further includes a program executing the method and a computer readable storage medium storing the program.

DETAILED DESCRIPTION

Hereinafter, an embodiment of the present invention will be described with reference to the drawings. The drawings only schematically show an example of the invention. They may have a mismatch to each other due to different magnification in each direction.

Figure 1:
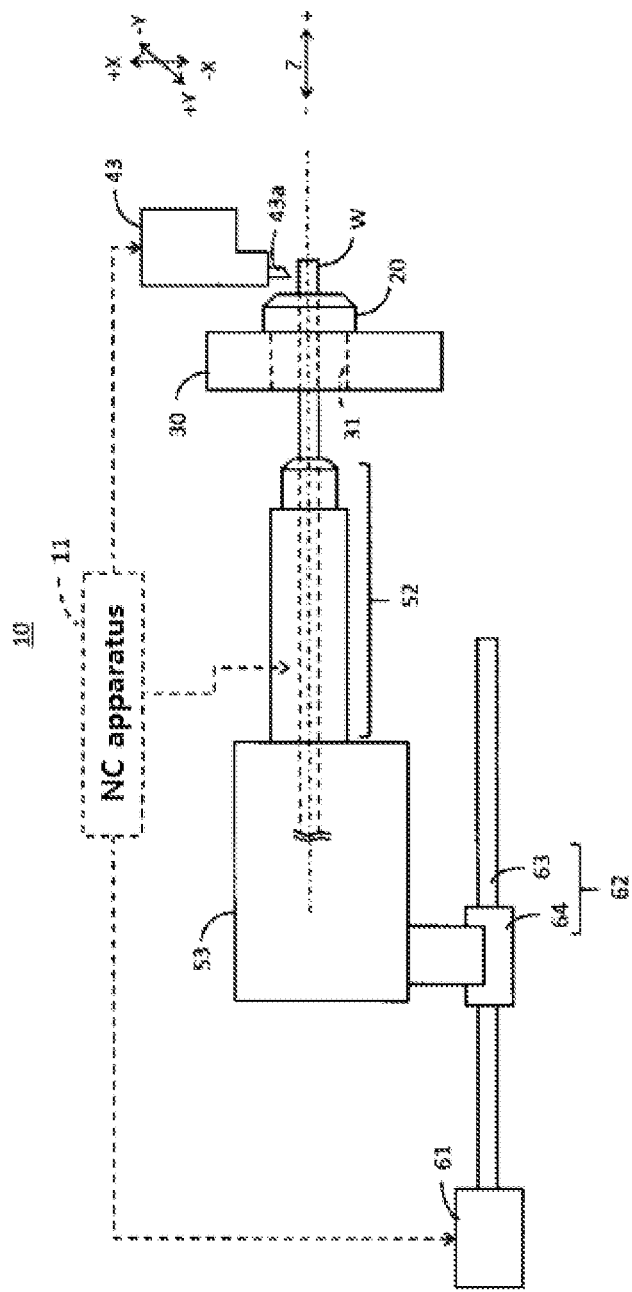
FIG. 1 is a block diagram schematically showing a configuration of a lathe.

1. Hardware Configuration:

FIG. 1 shows an example of an NC (Numerical Control) lathe 10 of the embodiment. The NC lathe 10 is a kind of a machine tool. The NC lathe 10 may comprise an NC (Numerical Control) apparatus 11 or a computing apparatus that numerically controls an operating unit (a machining unit) such as a spindle 52 to machine a workpiece W. The workpiece measurement method may be embodied by at least part of the configuration constituting the NC lathe 10.

The operating unit may include the spindle 52, a headstock 53 on which the spindle 52 is mounted, a tool post 43, a guide bush (GB) 20, a GB supporting unit 30, and an actuator 61. The headstock 53 with the spindle 52 may be movable in the axial direction (Z-axis direction) of the spindle 52. The Z-axis direction is horizontally extended in FIG. 1. Only for explanation convenience, the plus side (the right side in FIG. 1) shall be referred to as the front side and the minus side (the left side in FIG. 1) shall be referred to as the rear side. The spindle 52 may be provided with a collet 57 (FIG. 6) at the front end thereof. The collet 57 may releasably hold the bar workpiece W supplied from the rear side of the headstock 53 in the Z-axis direction.

The spindle 52 may be rotatable on the Z-axis. A structure denoted by 52 in FIG. 1 comprises a rotatable spindle holding the workpiece W to be rotatable on the Z-axis and a non-rotatable cylinder outside the rotatable spindle. Such structure may be referred to as a spindle structure. The spindle 52 may comprise the spindle structure.

The GB supporting unit 30 may be provided on the front side of the spindle 52. The GB supporting unit 30 may be fixed to the machining unit. The GB supporting unit 30 may have a through-hole 31 formed around the Z-axis so as to penetrate in the Z-axis direction. The GB 20 may be removably attached to the GB supporting unit 30 in such manner as, for example, part of the GB 20 fits into the through-hole 31 of the GB supporting unit 30. FIG. 1 shows that the GB 20 is attached to (supported by) the GB supporting unit 30. The workpiece W protruding forward from the spindle 52 may be further protruded to the front side through the GB supporting unit 30 and the GB 20. The GB 20 may hold the outer circumference of the workpiece W protruded forward along the Z-axis.

A tool 43a attached to the tool post 43 may be used to machine the workpiece W protruded forward from the GB supporting unit 30 (protruded forward from the GB 20 in FIG. 1). A variety of tools may be simultaneously or exchangeably attached to the tool post 43. The tools may include a turning tool for front machining use and a cut-off tool. The tool post 43 may be movable in an X-axis direction (the up-down direction in FIG. 1) perpendicular to the Z-axis direction. The tool post 43 may be movable in a Y-axis direction (the perpendicular direction to the surface of paper in FIG. 1) perpendicular to the X-axis and the Z-axis directions The tool post 43 may be distant from the GB supporting unit 30 as shown in FIG. 1. The tool post 43 may be, however, supported on the GB supporting unit 30 in a movable manner in the X-axis and the Y-axis directions. The GB supporting unit 30 may include a support structure for another tool post (not shown).

A ball screw mechanism 62 may be driven by the actuator 61. A linear motion unit 64 may move along a screw shaft 63 extended parallel to the Z-axis direction of the ball screw mechanism 62. The linear motion unit 64 may be directly or indirectly fixed to the headstock 53. The headstock 53 and the spindle 52 mounted thereon may move back and forth in the Z-axis direction as the linear motion unit 64 moves. The actuator 61 may comprise a motor (such as a linear motor and a servo motor) that supplies power to the ball screw mechanism 62. The ball screw mechanism 62 is only an example of means that moves the headstock 53 with the spindle 52 in the Z-axis direction. Instead, the actuator 61 may drive a hydraulic or electric linear motion cylinder to move the headstock 53 with the spindle 52 in the Z-axis direction.

Figure 2:
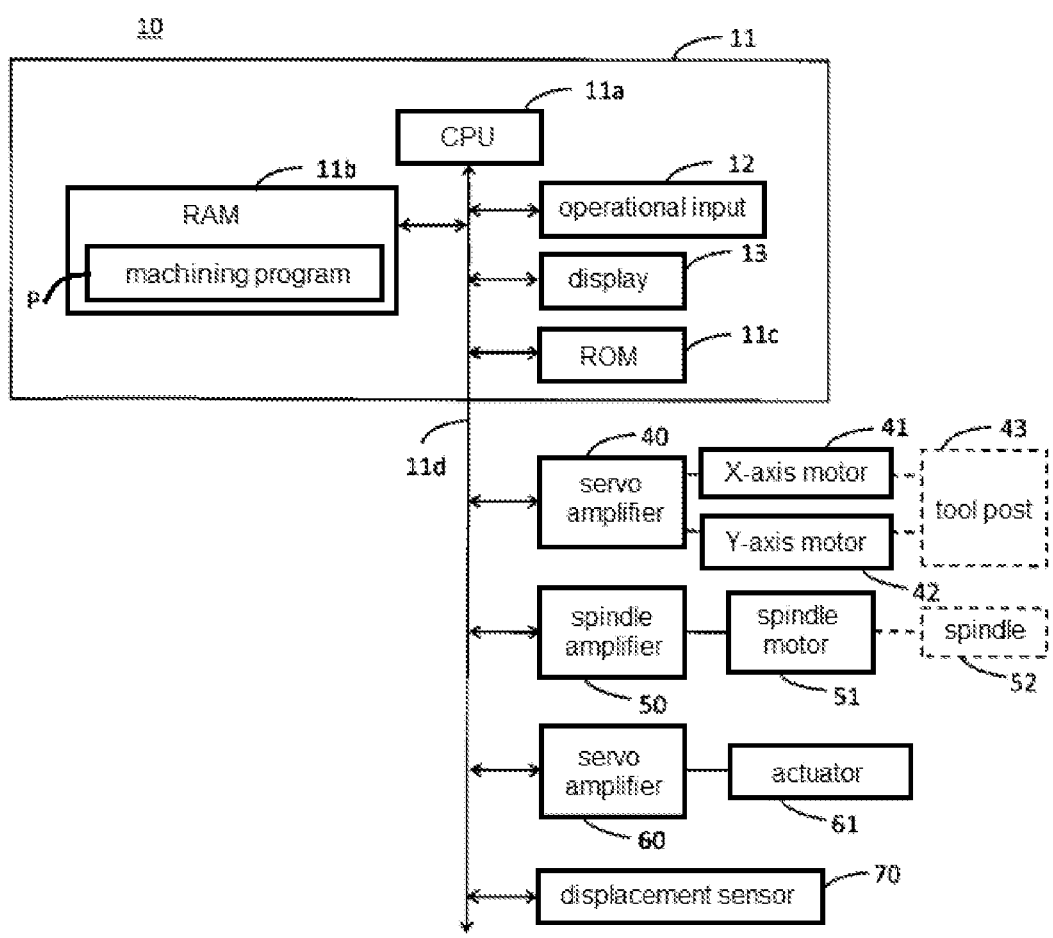
FIG. 2 is a block diagram schematically showing an electrical connection in the lathe.

FIG. 2 is a block diagram schematically showing electrical connection of the operation units in the NC lathe 10. The NC apparatus 11 may comprise a CPU 11a as a controller, a RAM 11b, and a ROM 11c. A servo amplifier 40, a spindle amplifier 50, another servo amplifier 60, and a displacement sensor 70 may be communicatively connected to the NC apparatus 11 with a bus 11d. The servo amplifier 40 may be connected to an X-axis motor 41 and a Y-axis motor 42 to supply power thereto. The X-axis motor 41 and the Y-axis motor 42 may be connected to the tool post 43 to transform supplied power to a driving force to cause the tool post 43 to move in the X-axis and Y-axis directions.

The servo amplifier 60 may be connected to the actuator 61 to supply power thereto. The spindle amplifier 50 may be connected to a spindle motor 51 to supply power thereto. The spindle motor 51 may be connected to the spindle 52. The spindle motor 51 may transform supplied power to a torque for the spindle 52. The NC apparatus may further control an actuator (not shown) to open and close the collet 57 provided in the spindle 52.

In the NC apparatus 11, the CPU 11a may execute a machining program P using the RAM 11b as a work area and numerically control power supply to the amplifiers 40, 50, and 60 to machine the workpiece W from which a product is produced in the NC lathe 10. The machining program P may include a variety of commands. The NC apparatus 11 may be provided with an operation input 12 and a display 13. The operation input 12 may comprise a button, a key, and further a touch panel on the display 13. The display 13 may be a display showing a user input value and a variety of information about the NC lathe 10.

The displacement sensor 70 may be mounted on at least one of the GB20 and the supporting unit for the spindle 52. The GB 20 may be a guide bush that supports the workpiece W on the front side of the spindle 52. The supporting unit for the spindle 52 may comprise the GB supporting unit 30 in FIG. 1. The mounting position of the displacement sensor 70 is being described later referring to FIG. 4 to FIG. 6. The NC lathe 10 may not be limited to the configuration as described above. The tool post 43 may be movable in another direction but the direction described above. The NC lathe 10 may be provided with a back spindle which holds the front end of the workpiece W protruded forward from the spindle 52.

Figure 3:
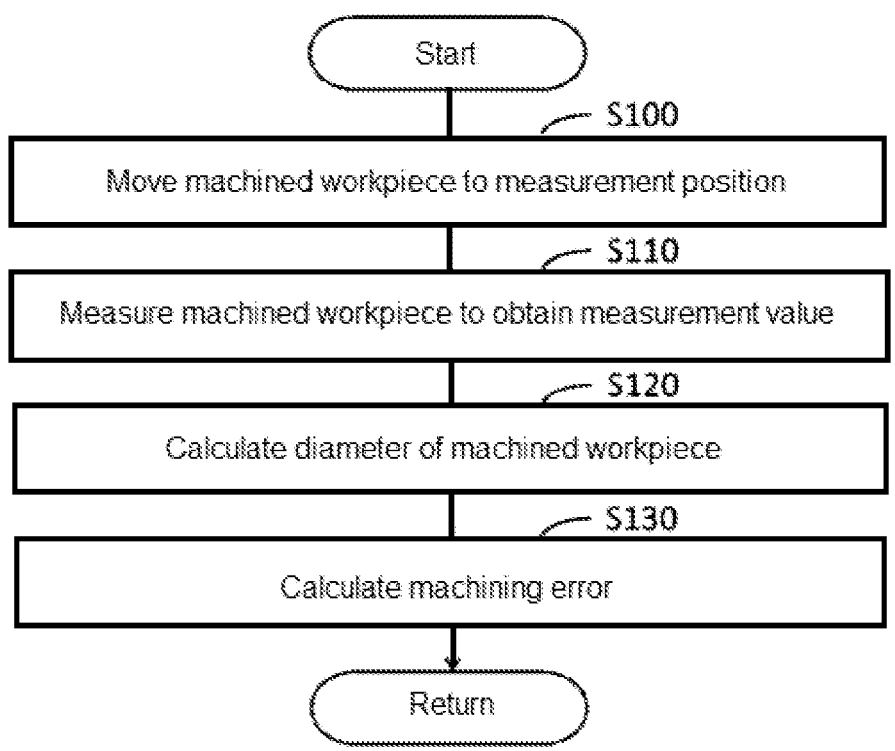
FIG. 3 is a flow chart showing a diameter measuring process of the machined workpiece.

2. Diameter Measuring Process of Machined Workpiece:

FIG. 3 is a flow chart showing a diameter measuring process of a machined workpiece executed by the NC apparatus (the CPU 11a) in accordance with the machining program P. The NC apparatus 11 may execute a variety of commands included in the machining program P to machine the workpiece W by the operation units of the NC lathe 10. The diameter measuring process may be part of the machining process executed in accordance with the machining program P. The NC apparatus 11 may start the diameter measuring process upon receipt of a command for the diameter measuring process. The diameter measuring process may be started at a predetermined timing in the machining process of the workpiece.

The predetermined start timing may be the time at which a predetermined time (several tens of minutes, for example) has elapsed since the previous diameter measuring process. The NC apparatus 11 may periodically execute the diameter measuring process during the machining process repeatedly producing a product from the workpiece W. The predetermined start timing may be the time at which a predetermined number of products (several tens of products, for example) have been produced from the workpiece W since the previous diameter measuring process. The NC apparatus 11 may start the diameter measuring process when a first product is produced from the workpiece W in the machining process resumed (upon a first production after resumption) after a suspension, for example, by a user instruction. The machining program P may include a command for the diameter measuring process to be executed at such predetermined start timing.

The NC apparatus 11 may first move the workpiece W to the predetermined measurement position upon start of the diameter measuring process of the machined workpiece (Step S100). The front end of the workpiece W has been worked by, for example, the tool 43a (and the worked front end has not been separated off the workpiece W.) The worked front end of the workpiece W may be referred to as a machined portion of the workpiece W. The NC apparatus may be aware of the Z-axis position of the machined portion of the workpiece W. In Step S100, the NC apparatus 11 may activate the actuator 61 by the servo amplifier 60 to move the headstock 53 and the spindle 52. The workpiece W held by the collet 57 of the spindle 52 may be accordingly moved to the rear side. The NC apparatus 11 may move the headstock 53 and the spindle 52 until the machined portion of the workpiece W reaches the predetermined Z-axis position which has been decided as the measurement position.

When the machined portion reaches the predetermined position, the NC apparatus 11 may measure the machined portion by the displacement sensor 70 and obtain a measurement result (a measurement value) (Step S110). Step S110 is an example of a measuring process of the invention.

The displacement sensor 70 in an activated state may constantly or repeatedly measure the workpiece W. A measurement value obtained at the timing of Step S110 may be the measurement value of the machined portion of the workpiece W.

The NC apparatus 11 may calculate the diameter of the machined workpiece (Step S120) based on the measurement value obtained in Step S110. Step S120 is an example of a calculating process of the invention. The diameter measuring process of the machined workpiece may be complete in Step S120. Step S120, however, may be followed by Step S130 as shown in FIG. 3.

In Step S130, the NC apparatus 11 may calculate a machining error of the workpiece W based on the diameter calculated in Step S120. The NC apparatus 11 may have a value of a target diameter d2 for the diameter d1 of the machined workpiece. The target diameter d2 may be, for example, a user input value received via the operation input 12. The NC apparatus 11 may calculate a difference between d1 and d2 to obtain a machining error of the workpiece W.

The NC apparatus 11 may then complete the FIG. 3 flow chart and resumes the machining process of the workpiece W.

The NC apparatus 11 may add a correction in the resumed machining process according to the calculated machining error. The NC apparatus may correct, for example, movement amount of the tool post 43 to lessen the error near zero in the next machining process. The calculated machining error is a sum of thermal displacement of the operation units constituting the machining unit. Such correction made according to the calculated machining error may be referred to as a thermal displacement correction.

3. Embodiment:

An embodiment of the invention is being described.

First Embodiment

Figure 4:
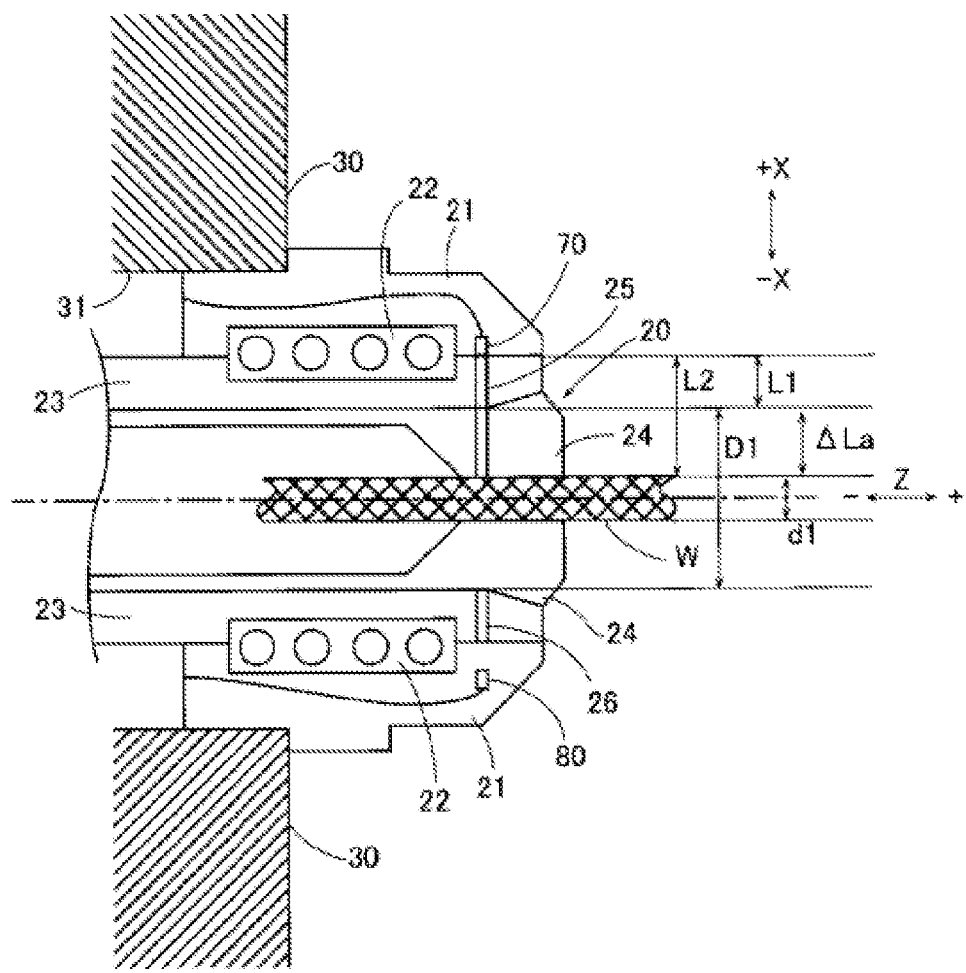
FIG. 4 is a drawing for explaining a displacement sensor of the first embodiment.

FIG. 4 is a drawing for explaining the displacement sensor 70 of the first embodiment. The drawing is a sectional view (vertical to the Y-axis direction) of the GB 20 attached to the through-hole 31 of the GB supporting unit 30. The GB 20 is not hatched only for visibility.

The GB 20 may comprise a cylindrical non-rotatable section 21 and a rotatable section (23, 24) inside the non-rotatable section 21. The rotatable section (23, 24) holding the workpiece W may be rotatable on the Z-axis in synchronization with the spindle 52. A bearing 22 may be disposed between the non-rotatable section 21 and the rotatable section (23, 24). The section inside the bearing 22, which is the rotatable section (23, 24), may be rotatable. The rotatable section (23, 24) may be rotatable in synchronization with the spindle 52 by receiving the power of the spindle motor 51 (FIG. 2). Alternatively, the rotatable section (23, 24) may be rotatable in synchronization with the spindle 52 by receiving the power of a not shown motor. The NC apparatus 11 may synchronously control the spindle motor 51 and the not shown motor to rotate the rotatable section (23, 24) in synchronization with the spindle 52.

The rotatable section (23, 24) may comprise a first rotatable section 23 on the outer side (on the non-rotatable section side) and a collet (a chucking mechanism) 24 on the inner side. Inside the GB 20, the collet 24 may releasably hold the workpiece W in a slidable manner in the Z-axis direction. The NC apparatus 11 may control the operation of the collet 24 in accordance with the machining program P.

The displacement sensor 70 may be embedded in the non-rotatable section 21 in the position facing the first rotatable section 23 as shown in FIG. 4. The displacement sensor 70 may comprise a sensor of any type including a eddy current sensor, optical sensor, and image recognition sensor. The displacement sensor 70 measuring the distance to the object may be called a distance measuring sensor. Part of the workpiece W shown in FIG. 4 may be the machined portion of the workpiece W which has reached the predetermined Z-axis position, the measurement position by the displacement sensor 70 in Step S100 (FIG. 3). The NC apparatus 11 may keep the collet 24 closed until, for example, the start of Step S110 to keep the position of the workpiece W.

The rotatable section (23, 24) may have a through-hole 25 (a second through-hole) to expose part of the workpiece W. The first rotatable section 23 may further have a through-hole 26 (a third through-hole) to expose part of the collet 24. The through-hole 25 may penetrate through the first rotatable section 23 and the collet 24. The through-hole 26 may penetrate through the first rotatable section 23 in a different position from the through-hole 25. The through-holes 25 and 26 each is in a Z-axis position matching with the measurement position by the displacement sensor 70.

Figure 5:
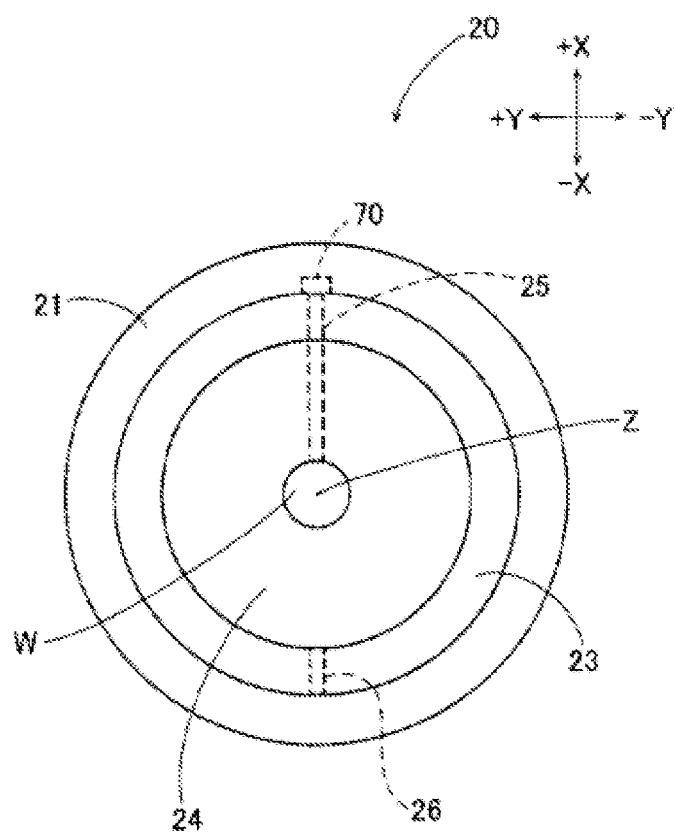
FIG. 5 schematically shows a guide bush viewed from the front side in the Z-axis direction.

FIG. 5 is a drawing for explaining the position of the through-holes 25 and 26. The drawing is a cross view of the GB 20 (seen from the front side in the Z-axis direction). The displacement sensor 70 may be embedded in the non-rotatable section 21 in the position facing the first rotatable section 23. The through-holes 25 and 26 each may be formed in a different position by angle of 180 degrees on the Z-axis in a plane vertical to the Z-axis. The through-holes 25 and 26 may not be limited to the FIG. 5 arrangement. They may be formed in any position as far as they are not overlapped to each other in the plane vertical to the Z-axis.

The displacement sensor 70 may measure a distance L2 to the surface of the workpiece W (the machined portion) through the through-hole 25 when the through-hole 25 comes to a position on a straight line connecting the Z-axis and the displacement sensor 70 in the plane vertical to the Z-axis as the rotatable section (23, 24) is rotated on the Z-axis. The displacement sensor 70 may measure a distance L1 to the surface of the collet 24 through the through-hole 26 when the through-hole 26 comes to a position on a straight line connecting the Z-axis and the displacement sensor 70 in the plane vertical to the Z-axis as the rotatable section (23, 24) is rotated on the Z-axis. The displacement sensor 70 may measure a shortest distance near zero to the surface of the first rotatable section 23 when any of the through-holes 25 and 26 is not in a position matching with the displacement sensor 70 as the rotatable section (23, 24) is rotated on the Z-axis. Accordingly, the displacement sensor 70 can measure three different distances as the rotatable section (23, 24) is rotated on the Z-axis. The NC apparatus 11 may determine the greatest distance as the distance L2 and the second greatest distance as the distance L1.

In Step S110 (FIG. 3), the NC apparatus 11 may acquire the distance L1 and the distance L2 from among the time-varying values measured by the displacement sensor 70. The NC apparatus 11 may rotate the GB 20 (the rotatable section (23, 24)) in Step S110.

In Step S120, the NC apparatus 11 may calculate the diameter of the machined workpiece W based on the measurement values (the distance L1, L2) acquired in Step S110 by using formula:

$$d1 = D1 - 2 \times \Delta La \qquad (1)$$

The distance D1 (FIG. 4) may be a known diameter of the collet 24. The NC apparatus 11 may have the D1 value as pre-information. The distance $\Delta La$ (FIG. 4) may be obtained from formula: L2−L1. According to the first embodiment, the NC apparatus 11 can calculate the diameter d1 of the machined workpiece with accuracy by using the known distance D1 and the distances L1 and L2 measured by the displacement sensor 70 mounted in the GB 20 holding the workpiece W.

Second Embodiment

Figure 6:
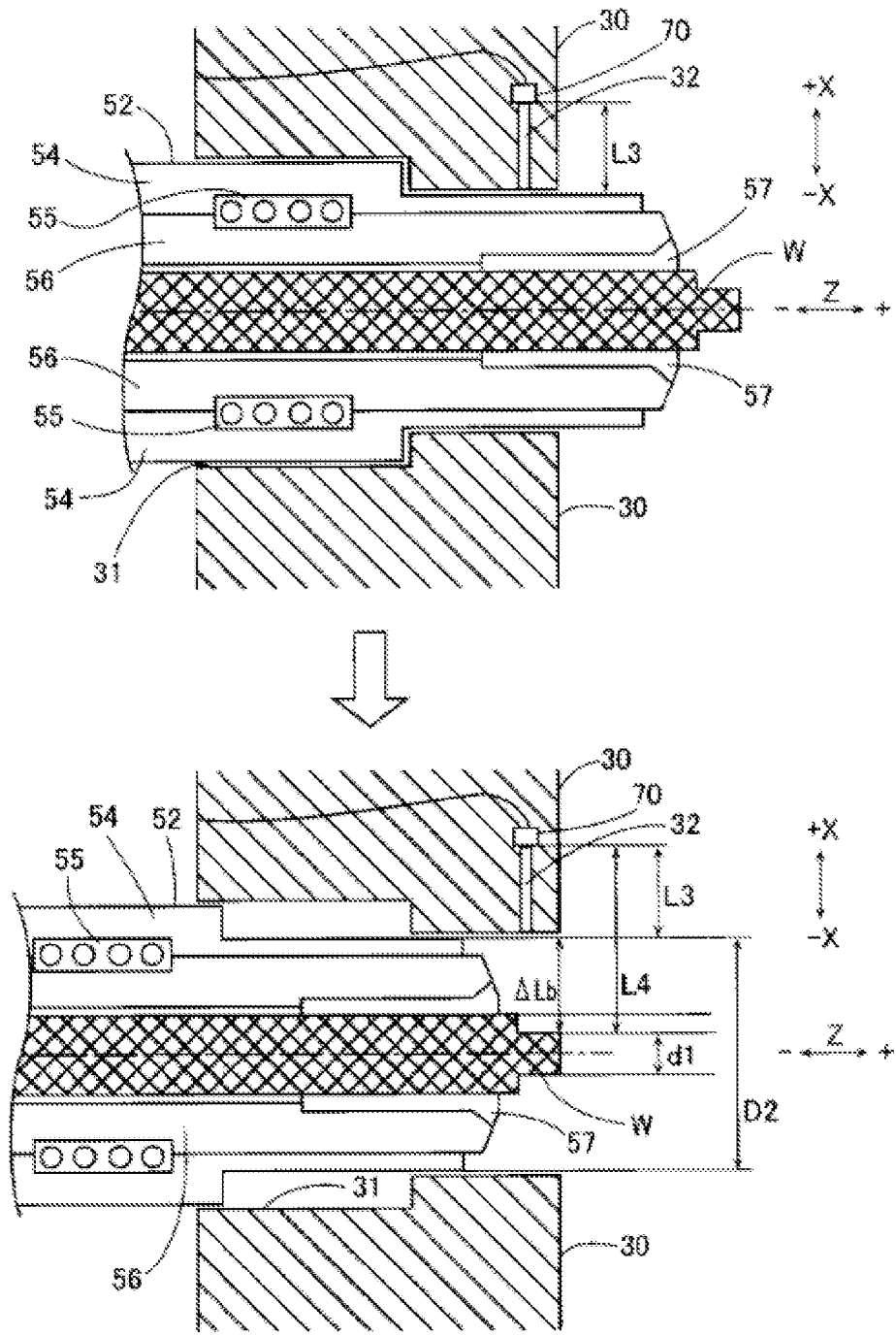
FIG. 6 is a drawing for explaining a displacement sensor of the second embodiment.

FIG. 6 is a drawing for explaining the displacement sensor 70 of the second embodiment. The drawing is a sectional view (vertical to the Y-axis direction) of the spindle 52 inserted in the through-hole 31 of the GB supporting unit 30. The spindle 52 is not hatched only for visibility. The GB 20 shown in FIG. 1 and FIG. 4 is removed from the GB supporting unit 30. The headstock 53 may be moved to the front side until the spindle 52 is inserted into the through-hole 31 of the GB supporting unit 30 to be supported by the GB supporting unit 30. The inner wall of the GB supporting unit 30 may be of a shape capable of stably supporting the inserted spindle 52.

When the inserted spindle 52 is positioned with respect to the GB supporting unit 30, part of the front end of the spindle 52 may be protruded from the GB supporting unit 30 to the front side. The workpiece W held by the spindle 52 supported by the GB supporting unit 30 may be protruded from the spindle 52 to the front side to be worked by the tool 43a on the tool post 43. Such method may be called a non-guide bush method. In FIG. 1 and FIG. 4, the GB 20 may be attached to the GB supporting unit on the front side of the spindle 52 to support the workpiece W held by the spindle 52. Such method may be called a guide bush method. The first embodiment described above relates to the diameter measurement process of the machined workpiece executed at a predetermined timing in the machining process of the guide bush method.

The second embodiment described above relates to the diameter measurement process of the machined workpiece executed at a predetermined timing in the machining process of the non-guide bush method. The spindle 52 may comprise a cylindrical non-rotatable section 54 and a rotatable section (56, 57) inside the non-rotatable section 56. The rotatable section (56, 57) holding the workpiece W may be rotatable on the Z-axis. A bearing 55 may be disposed between the non-rotatable section 54 and the rotatable section (56, 57). The section inside the bearing 55, which is the rotatable section (56, 57), may be rotatable. The rotatable section (56, 57) may be rotatable by receiving the power of the spindle motor 51 (FIG. 2). Part of the front end of the rotatable section (56, 57) may be the collet 57 (chucking mechanism) for holding the workpiece W.

The displacement sensor 70 may be embedded in the GB supporting unit 30 as shown in FIG. 6. The GB supporting unit 30 may have a through-hole 32 (a fourth through-hole) extended in the X-axis direction from the inner wall of the through-hole 31 to the displacement sensor 70. A thinner front portion of the workpiece W in FIG. 6 may be the machined portion that has been worked by the tool. The upper drawing shows the state in which machining on the workpiece W has been just finished in the machining process of the non-guide bush method (the front end of the workpiece W has been machined). The lower drawing shows the state in which the machined portion has reached the predetermined Z-axis position (the measurement position by the displacement sensor 70) in Step S100 (FIG. 3).

Figure 7:
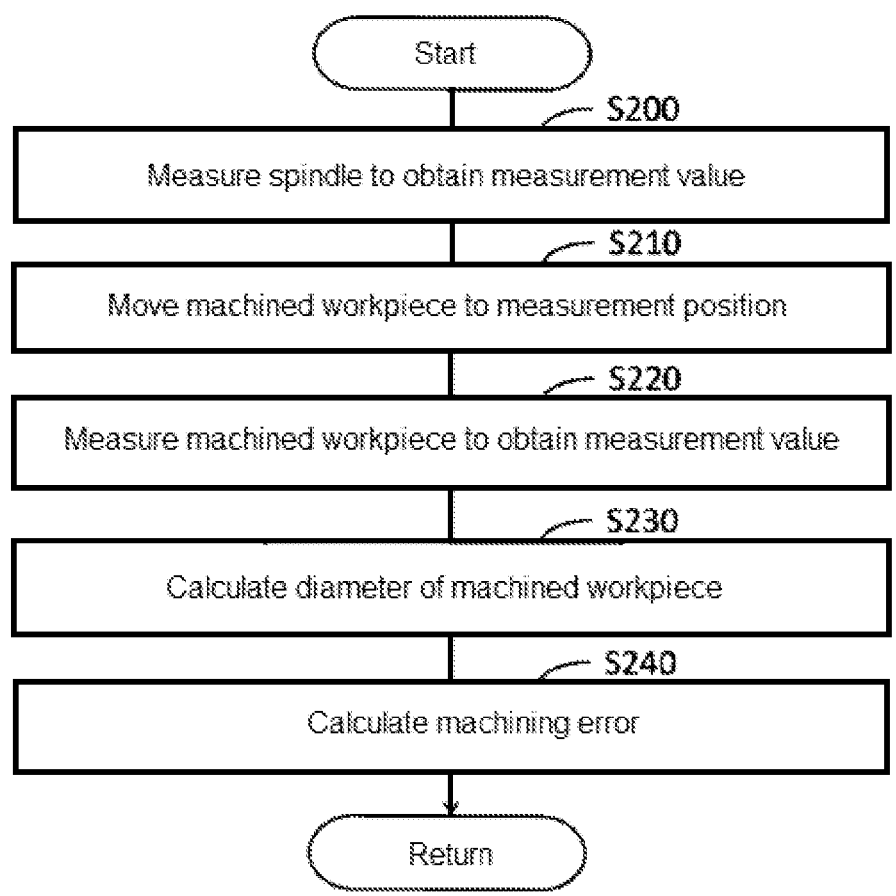
FIG. 7 is a flow chart showing a diameter measuring process of the machined workpiece in the second embodiment.

The diameter measurement process of the machined workpiece according to the second embodiment is being described referring to the FIG. 7 flow chart. The steps S210 to S240 may basically correspond to the steps S100 to S130 though different in measurement position and measurement value. Further, FIG. 7 includes a Step S200 that FIG. 3 does not have.

The NC apparatus 11 may determine that it is the time to start the measurement process and then execute the process by the displacement sensor 70 to obtain a measurement value about the spindle (Step S200). The displacement sensor 70 may measure a distance L3 to the surface of the spindle 52 (the non-rotatable section 54) through the through-hole 32 when machining is completed, that is when the front end portion of the spindle 52 is protruded from the GB supporting unit 30 as shown in the upper drawing (FIG. 6). The NC apparatus 11 may obtain the distance L3 from the measurement value by the displacement sensor 70 in Step 200.

The NC apparatus 11 may then proceed to Step S210 where the machined workpiece W is moved to the predetermined measurement position of the displacement sensor 70. The headstock 53 with the spindle 52 is moved to the rear side until the machined portion of the workpiece W reaches the predetermined measurement position on the Z-axis.

The NC apparatus 11 may then proceed to Step S220 where the machined portion of the workpiece W is measured by the displacement sensor 70 to acquire the measurement result (the measurement value). Step S220 may be an example of the measuring process of the invention. In Step S 220, the machined portion is in a Z-axis position matching with the displacement sensor 70 as shown in the lower drawing (FIG. 6). The displacement sensor 70 may measure a distance L4 to the surface of the machined portion of the workpiece W held by the spindle 52 through the through-hole 32. The NC apparatus 11 can acquire the distance L4 from the measurement value by the displacement sensor 70 in Step S220.

The NC apparatus 11 may calculate the diameter d1 of the machined workpiece W based on the measurement values acquired in Step S200 and S220. Step S230 may be an example of the calculating process of the invention. In Step S230, the NC apparatus 11 may calculate the diameter d1 of the machined workpiece W based on the measurement values (the distance L3, L4) by using a formula:

$$d1 = D2 - 2 \times \Delta Lb \quad (2)$$

The distance D2 (FIG. 6) may be a known diameter of the spindle 52 (in the position measured in Step 200). The NC apparatus 11 may have the D2 value as pre-information. The distance $\Delta Lb$ (FIG. 6) may be obtained from formula: L4−L3. According to the second embodiment, the NC apparatus 11 can calculate the diameter d1 of the machined workpiece with accuracy by using the known distance D2 and the distances L3 and L4 measured by the displacement sensor 70 mounted in the GB supporting unit 30 holding the spindle 52 in the non-guide bush method.

In Step S240, the NC apparatus 11 may calculate a difference between the calculated diameter d1 and the target diameter d2 to obtain a machining error of the workpiece W in a manner like Step S130.

4. Conclusion and Others:

According to the embodiment, the machine tool may comprise the displacement sensor 70 mounted on at least one of the GB20 and the GB supporting unit 30. The GB 20 may hold the workpiece on the front side of the spindle 52 holding the workpiece W. The GB supporting unit 30 may support the spindle 52. The machine tool may further comprise the calculating unit (the NC apparatus 11 and the CPU 11a) which calculates the diameter of the machined workpiece based on the measurement value of the machined workpiece by the displacement sensor 70. Arrangement of the displacement sensor 70 in a narrower range with respect to the workpiece W can provide an accurate measurement result (calculation result) of the workpiece diameter d1 with little error regardless of influence of thermal displacement.

The effect of the invention is being further described. The GB20, the workpiece W and the units around them as shown in FIG. 4 are subject to large amount of lubricant inside the NC lathe 10 during operation. The temperature of each unit is affected by the temperature of lubricant, resulting in that the GB 20, the displacement sensor 70 mounted on the GB20, the machined portion of the workpiece W all arranged in a narrower range are almost the same in temperature. Thermal displacement of an object varies according to temperature. Thermal displacement of a plurality of objects are almost the same as each other if the objects are almost the same in temperature. Accordingly, in an environment where all the units related to the workpiece measurement by the displacement sensor 70 are almost the same in temperature, the measurement result is almost the same regardless of different temperature conditions.

The setting of each unit may be adjusted to make a machining error zero (d1=d2) in the NC lathe 10 in the first embodiment. In ideal conditions, the GB 20, the displacement sensor 70 mounted on the GB20, the machined portion of the workpiece W is 20° C. each in temperature, and the distances are:

D1=30.000 mm
d2=10.000 mm
L1=5.000 mm
L2=15.000 mm

When the temperature is increased to 30° C., the distance L1 measured by the displacement sensor 70 is increased to 5.00006 mm under the influence of thermal displacement of the plurality of objects. The diameter d1 may be calculated by formula (1):

$$d1 = 30.000 - 2 \times (9.9994) = 10.0001 \text{ mm}$$

A difference (a machining error) from the target diameter d2 is 0.0001 mm (0.1 μm) at an increased temperature by 10° C. where the target diameter d2 is 10.000 mm. A machining error of that much (only one hundredth mm) is relatively so small in a negligible level under the influence of thermal displacement occurring in each of the units including the workpiece W, the spindle 52, the headstock 53, a headstock support table, the tool post 43, and a tool post support table. The embodiment provides a measurement result with accuracy regardless of different temperature conditions.

It is likely in conventional arts that an error is added in the measurement process. A machining error calculated based on such incorrect measurement result might be incorrect. As a result, thermal displacement correction cannot be properly executed. In the invention, however, the diameter of the machined workpiece can be measured with accuracy regardless of temperature conditions in the place where the displacement sensor 70 is mounted. The machining error therefore exactly represents thermal displacement in the NC lathe 10 (the operation units). As a result, thermal displacement correction can be properly executed to improve machining accuracy of the workpiece W.

The displacement sensor 70 may comprise a processor such as a CPU and a storing unit such as a memory. The displacement sensor 70 may receive an instruction from the NC apparatus 11 in Step S110, Step S200, and Step S220 each to perform measurement for the workpiece W or the spindle 52 and transmit the measurement result to the NC apparatus 11. In the second embodiment, the displacement sensor 70 may store the measurement value (the distance L3) in the storing unit in Step S200 and may measure the distance L4 and retrieve the distance L3 stored in the storing unit in Step S220. The NC apparatus may communicate with the displacement sensor 70 with either wired or wireless method.

In one of the embodiments, a temperature sensor 80 may be additionally provided to measure the temperature of the neighborhood of the displacement sensor 70. The NC apparatus may then correct the measurement value by the displacement sensor 70 based on the measurement value by the temperature sensor 80 to calculate the workpiece diameter based on the corrected measurement value.

In FIG. 4, the temperature sensor 80 is attached to the non-rotatable section 21 of the GB 20. The temperature sensor 80 may communicate with the NC apparatus 11 with either wired or wireless method. The temperature sensor 80 can measure the temperature of the GB 20 where the displacement sensor 70 is mounted or the temperature of the neighborhood of the GB 20. The temperature sensor 80 may be also attached around the through-hole 31 of the GB supporting unit 30 (FIG. 6). An electrical signal corresponding to the measurement value by the displacement sensor 70 (the distances L1, L2, L3, and L4) is variable according to ambient temperature. The NC apparatus 11 may additionally acquire the temperature from the temperature sensor 80 in Step S110, Step S200, and Step S220 each and correct the measurement value (the distances L1, L2, L3, and L4) by using a correction coefficient (a factor predetermined for temperatures each) depending on the acquired temperature before calculating the workpiece diameter in Step S120 and Step S230. The NC apparatus 11 can obtain a measurement result with more accuracy without influence of temperature.

The calculation of the workpiece diameter may not be limited to the method as described above. In the first embodiment, the NC apparatus 11 may have the outer diameter of the first rotatable section 23 of the GB 20 (FIG. 4) as a known value (D3). In Step S120 (FIG. 3), the NC apparatus 11 may obtain the workpiece diameter d1 by subtracting a value equivalent to double of the distance L2 from the distance D3.

In Step S100 (FIG. 3) and Step S210 (FIG. 7), the workpiece W held by the spindle 52 may be moved to the rear side to position the machined portion in the measurement position by the displacement sensor 70. Instead, the GB supporting unit 30 may be moved to the front side in the Z-axis direction to align the measurement position by the displacement sensor 70 with the machined portion of the workpiece W in Step 100 and Step 210.

The displacement sensor 70 may be mounted on one of the GB 20 and the supporting unit for the spindle 52 (the GB supporting unit 30). Further, the displacement sensor 70 may be mounted on both the GB 20 and the GB supporting unit 30. The displacement sensor 70 mounted on the GB 20 may be used to measure the workpiece W at a predetermined timing in the machining process of the guide bush method. The displacement sensor 70 mounted on the GB supporting unit 30 may be used to measure the workpiece W at a predetermined timing in the machining process of the non-guide bush method.

The GB supporting unit 30 where the displacement sensor 70 is mounted may be replaced by another supporting unit configured to support around the front end of the spindle 52. The displacement sensor 70 may be mounted on another supporting unit capable of supporting around the front end of the spindle 52 but provided with no guide bush.

The invention claimed is:

1. A machine tool comprising:
   a displacement sensor installed within at least one of a guide bush and a spindle supporting unit, the guide bush supporting a workpiece on a front side of a spindle holding the workpiece; and
   a calculating unit which calculates a diameter of the machined workpiece based on a measurement value of the machined workpiece by the displacement sensor.

2. The machine tool of claim 1, wherein the spindle is movable back and forth in an axial direction, and
   wherein the spindle is retracted after machining to bring a machined portion of the workpiece to a predetermined measurement position in the axial direction to allow the displacement sensor to measure the machined portion.

3. The machine tool of claim 2, wherein the guide bush comprises a cylindrical non-rotatable section and a rotatable section rotatable in synchronization with the spindle, the rotatable section is inside the non-rotatable section so as to support the workpiece, the rotatable section has a through-hole to expose part of the workpiece, and the displacement sensor mounted on the non-rotatable section measures the workpiece through the through-hole of the rotatable section.

4. The machine tool of claim 3 further comprising a temperature sensor which measures a temperature around a position where the displacement sensor is mounted, wherein the calculating unit corrects the measurement value of the workpiece by the displacement sensor according to a measurement value by the temperature sensor and calculates the diameter of the workpiece based on the corrected measurement value.

5. The machine tool of claim 2, wherein the spindle supporting unit is provided with the guide bush in a detachable manner, and the displacement sensor mounted on the spindle supporting unit measures the workpiece held by the spindle in a state that the guide bush is detached from the supporting unit and a front end of the spindle is placed at the location where the guide bush is detached.

6. The machine tool of claim 5 further comprising a temperature sensor which measures a temperature around a position where the displacement sensor is mounted, wherein the calculating unit corrects the measurement value of the workpiece by the displacement sensor according to a measurement value by the temperature sensor and calculates the diameter of the workpiece based on the corrected measurement value.

7. The machine tool of claim 2 further comprising a temperature sensor which measures a temperature around a position where the displacement sensor is mounted, wherein the calculating unit corrects the measurement value of the workpiece by the displacement sensor according to a measurement value by the temperature sensor and calculates the diameter of the workpiece based on the corrected measurement value.

8. The machine tool of claim 1, wherein the guide bush comprises a cylindrical non-rotatable section and a rotatable section rotatable in synchronization with the spindle, the rotatable section is inside the non-rotatable section so as to support the workpiece, the rotatable section has a through-hole to expose part of the workpiece, and the displacement sensor mounted on the non-rotatable section measures the workpiece through the through-hole of the rotatable section.

9. The machine tool of claim 8 further comprising a temperature sensor which measures a temperature around a position where the displacement sensor is mounted, wherein the calculating unit corrects the measurement value of the workpiece by the displacement sensor according to a measurement value by the temperature sensor and calculates the diameter of the workpiece based on the corrected measurement value.

10. The machine tool of claim 1, wherein the spindle supporting unit is provided with the guide bush in a detachable manner, and the displacement sensor mounted on the spindle supporting unit measures the workpiece held by the spindle in a state that the guide bush is detached from the supporting unit and a front end of the spindle is placed at the location where the guide bush is detached.

11. The machine tool of claim 10 further comprising a temperature sensor which measures a temperature around a position where the displacement sensor is mounted, wherein the calculating unit corrects the measurement value of the workpiece by the displacement sensor according to a measurement value by the temperature sensor and calculates the diameter of the workpiece based on the corrected measurement value.

12. The machine tool of claim 1 further comprising a temperature sensor which measures a temperature around a position where the displacement sensor is mounted, wherein the calculating unit corrects the measurement value of the workpiece by the displacement sensor according to a measurement value by the temperature sensor and calculates the diameter of the workpiece based on the corrected measurement value.

13. The machine tool of claim 1,
   wherein the displacement sensor measures the machined workpiece and the calculating unit calculates the diameter of the machined workpiece based on a measurement value of the machined workpiece by the displacement sensor.

* * * * *